(12) United States Patent
Fujii

(10) Patent No.: US 7,234,979 B2
(45) Date of Patent: Jun. 26, 2007

(54) BATTERY TERMINAL

(75) Inventor: Gaku Fujii, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/455,738

(22) Filed: Jun. 20, 2006

(65) Prior Publication Data

US 2007/0066149 A1  Mar. 22, 2007

(30) Foreign Application Priority Data

Sep. 20, 2005  (JP) ............................ P2005-271434

(51) Int. Cl.
*H01R 4/28* (2006.01)
(52) U.S. Cl. ..................................... 439/754
(58) Field of Classification Search ......... 439/754–774
See application file for complete search history.

(56) References Cited

U.S. PATENT DOCUMENTS 5,183,419 A * 2/1993 Dewar ........................ 439/765
6,517,390 B2 * 2/2003 Kim ............................ 439/754
6,830,490 B2 * 12/2004 Murakami et al. .......... 439/755
6,884,123 B2 * 4/2005 Kim ............................ 439/754

FOREIGN PATENT DOCUMENTS

JP  2002 151048 A   5/2002
JP  2003-317700 A   11/2003

* cited by examiner

*Primary Examiner*—Briggitte R. Hammond
(74) *Attorney, Agent, or Firm*—Sughrue Mion, PLLC

(57) ABSTRACT

An electric wire connecting portion 7 comprises a plate portion 17 and a folded side plate portion 18 continuing to the plate portion 17. This plate portion 17 includes a stem hole 19 for inserting the stem 12 of a stud bolt 4 exclusively, and a plurality of locking projections 20 confront the head side faces 13 of the stud bolt 4. The folded side plate portion 18 includes a folded portion 21 continuing to the plate portion 17, and a head holding portion 22 confronting the head top face 14 of the stud bolt 4 at the folding time. The folded side plate portion 18 is provided, on its two sides and separately of the locking projections 20, with folded side locking protrusions 23 confronting the head side faces 13 of the stud bolt 4. These folded side locking protrusions 23 are provided with notches 27 for inserting and fitting the locking projections 20 therein.

3 Claims, 9 Drawing Sheets

BATTERY TERMINAL

BACKGROUND OF THE INVENTION

1. Field of the Invention

The present invention relates to a battery terminal having a stud bolt fixed on an electric wire connecting portion of a battery terminal body.

2. Related Art

The following JP-A-2003-317700 discloses two battery terminals, as follows. These individual battery terminals are described in the following with reference to FIG. 6 to FIG. 13. Here, the description is made on the basis of the procedure of steps of manufacturing the battery terminal.

At first, a battery terminal body 101 to constitute the first battery terminal is manufactured through first to third steps. At the first step, the stem 103 of a stud bolt 102 is inserted into a stem hole 104. At this time, the stud bolt 102 is dropped in the direction of arrows, and the stem 103 is inserted from the inner side to the outer side of a second joint plate 105. When the first step is completed, the procedure shifts to the second step.

At the second step, as shown in FIG. 8 and FIG. 9, connecting portions 106 and 106 are folded to superpose a first joint plate 107 over the side of the second joint plate 105. At this time, the first joint plate 107 is arranged over a top face 109 of the head 108 of the stud bolt 102, and a plurality of locking members 110 are arranged to confront the side faces 111 of the head 108. When the second step is completed, the procedure shifts to the third step.

At the third step, the folded portions 112 and 112 are folded to the sides of the first joint plate 107. When the folded portions 112 and 112 are folded to the side of the first joint plate 107, the first joint plate 107 and the second joint plate 105 are prevented from being carelessly opened. As a result, the series working steps are completed.

Next, a battery terminal body 121 to constitute the second battery terminal is manufactured through first to third steps. At the first step, as shown in FIG. 10 and FIG. 11, connected portions 124 and 124 are folded into such a U-shape that a first battery post hole 122 and the second battery post hole 123 may be aligned to each other, and a first joint plate 125 and a second joint plate 126 are superposed. At this time, the first joint plate 125 and the second joint plate 126 are superposed so far that the side walls 127 and 127 of the first joint plate 125 may abut against the second joint plate 126 (as shown in FIG. 11). By these superpositions, moreover, a locking hole 128 and a stem hole 129 are aligned to each other. When the first step is completed, the procedure shifts to the second step.

At the second step, as shown in FIG. 11 and FIG. 12, a stud bolt 130 is inserted from its step 131 into the stem hole 129 through the locking hole 128 directed upward. At this time, the stud bolt 130 is dropped in the direction of arrow such that its stem 131 is inserted from the outer side to the inner side of the first joint plate 125 and from the inner side to the outer side of the second joint plate 126. The stud bolt 130 has its stem 131 inserted into the stem hole 129 and its head 132 inserted into the locking hole 128. When the second step is completed, the procedure shifts to the third step.

At the third step, axial locking portions 133 and 133 of the second joint plate 126 are folded at a right angle inward (as referred to arrows) to cover the locking hole 128 partially from the outer side of the first joint plate 125. When the works to fold the axial locking portions 133 and 133 are ended, the series working steps are completed (as referred to FIG. 13).

The battery terminal body 101 constituting the first battery terminal has the following problems. Specifically, when the stud bolt 102 is inserted into the stem hole 104, the stud bolt 102 is still rotatable. If the head 108 of the stud bolt 102 shifts out of the specified position, the first joint plate 107 cannot be superposed on the side of the second joint plate 105. This results in a problem that the productivity is poor.

The battery terminal body 101 is subjected to the punching and folding treatments. At the stage of these punching and folding treatments, the second joint plate 105 remains jointed to the not-shown portion. Moreover, the battery terminal body 101 is transferred in this state to the aforementioned first step.

With the second joint plate 105 being connected, the stud bolt 102 is so properly inserted at the first step into the stem hole 104 as to prevent the misalignment. However, the presence of the connected portion raises such a structural restriction as to make it necessary to provide the plural locking members 110 on the side of the first joint plate 107. The structural restriction causes the aforementioned problem. If the rotation locking portion is formed on the side of the first joint plate 125, as shown in FIG. 10, a portion for locking the axial movement of the bolt is needed resulting in the complex shapes of parts. Moreover, the poverty is also deteriorated.

On the other hand, the battery terminal body 121 constituting the second battery terminal has the following problem. Without the axial locking portions 133 and 133, specifically, the structure cannot block the axial removal of the bolt. After the first joint plate 125 and the second joint plate 126 were folded over each other, therefore, there is needed the step of folding the axial locking portions 133 and 133. This additional step raises a problem in the poor productivity.

SUMMARY OF THE INVENTION

The present invention has been conceived in view of the background thus far described, and has an object to provide a battery terminal capable of improving the productivity.

In order to solve the aforementioned problems, according to the invention of claim 1, there is provided a battery terminal having a stud bolt fixed on an electric wire connecting portion of a battery terminal body, characterized: in that the electric wire connecting portion includes a plate portion and a folded side plate portion continuing to the plate portion; in that the plate portion includes a stem hole for inserting the stem of the stud bolt exclusively, and a plurality of locking projections confronting the head side faces of the stud bolt; and in that the folded side plate portion includes a folded portion continuing to the plate portion, and a head holding portion confronting the head top face of the stud bolt at the folding time.

According to the invention having such characteristics, when the stem of the stud bolt is inserted into the stem hole of the plate portion, the head side faces of the stud bolt confront the plural locking projections, and then the head of the stud bolt is prevented from rotating by the plural locking projections. When the folded side plate portion is folded from this state toward the plate portion, the head holding portion of the folded portions confront the head top face of the stud bolt so that the head of the stud bolt is held.

According to the invention, the locking of the stud bolt is achieved from the initial state, for example, in which the plate portion is connected.

In the battery terminal of claim 1, according to claim 2, the folded side plate portion is provided, individually on its two sides and separately of the locking projections, with folded side locking protrusions confronting the head side faces of the stud bolt.

According to the invention having such characteristics, when the folded side plate portion is folded toward the plate portion, the folded side locking protrusions on the two sides of the folded side plate portion confront the head side faces of the stud bolt thereby to lock the stud bolt more reliably.

In the battery terminal of claim 2, according to claim 3, the folded side locking protrusions have notches for inserting and fitting the locking projections.

According to the invention having such characteristics, when the folded side plate portion is folded toward the plate portion, the notches existing in the folded side locking protrusions of the folded side plate portion and the locking projections of the plate portion come into fitted engagement. The folded side plate portion is positioned by the fitting engagement between the notches and the locking projections.

According to the invention of claim 1, the stud bolt is locked at the early stage, and the number of manufacturing steps is small. The advantage is that the productivity can be improved. Another advantage of the invention is that the stud bolt can be locked by the simple structure.

According to the invention of claim 2, the locking projections of the plate portion and the folded side locking protrusions of the folded side plate portion are provided to take an advantage that the stud bolt can be reliably locked.

According to the invention of claim 3, the advantage is that the folded side plate portion can be positioned by using the locking projections of the plate portion. Another advantage of the invention is that the locking projections can function for operations other than that to lock the stud bolt.

BRIEF DESCRIPTION OF THE DRAWINGS

FIG. 1A is a top plan view; FIG. 1B is a front elevation; and FIG. 1C is a bottom view.

BRIEF DESCRIPTION OF THE DRAWINGS

Figure 1A:
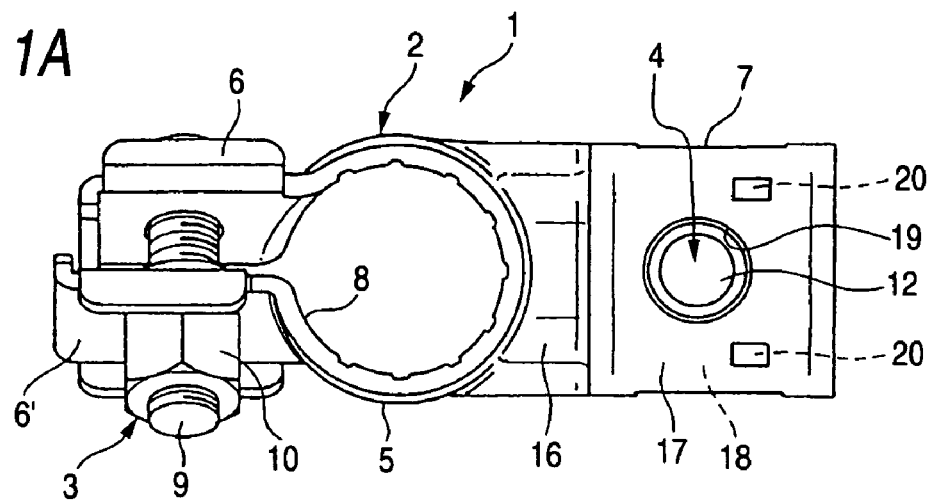
FIGS. 1A to 1C are views showing one embodiment of a battery terminal of the invention.
Figure 1B:
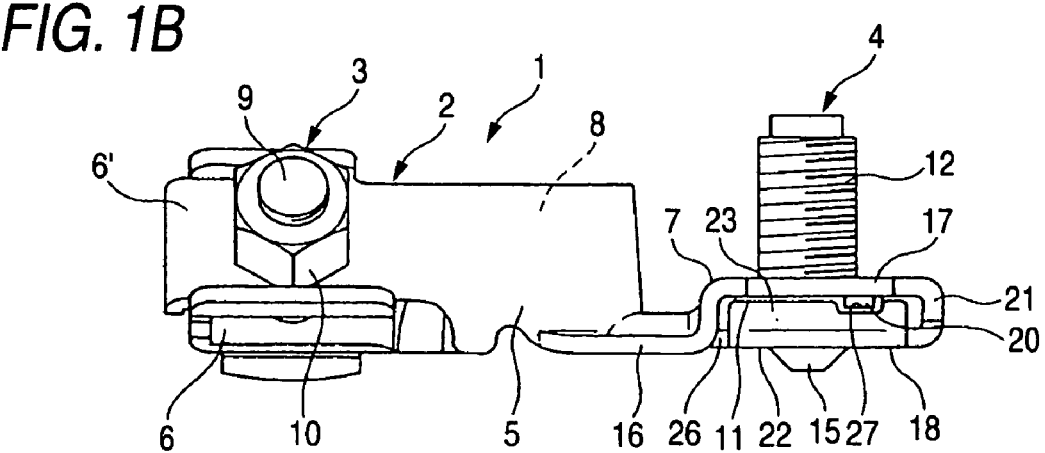
Figure 1C:
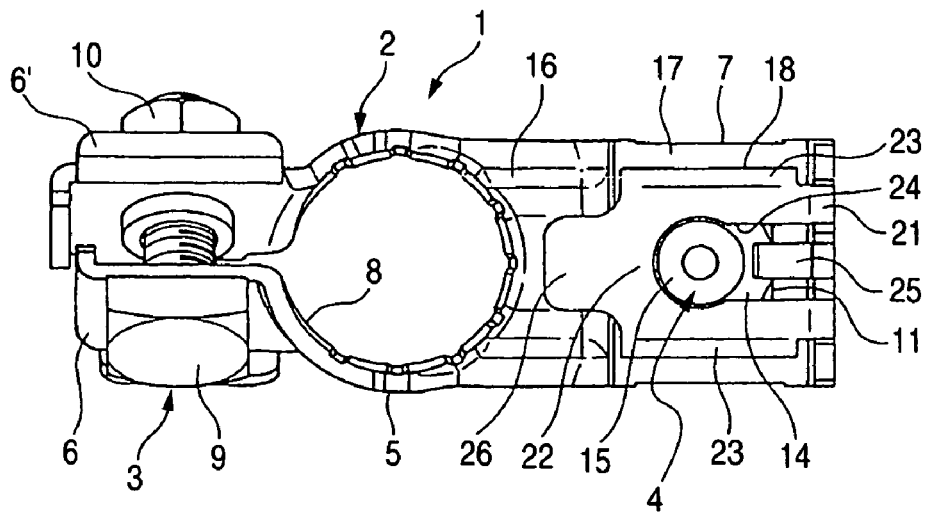
Figure 2:
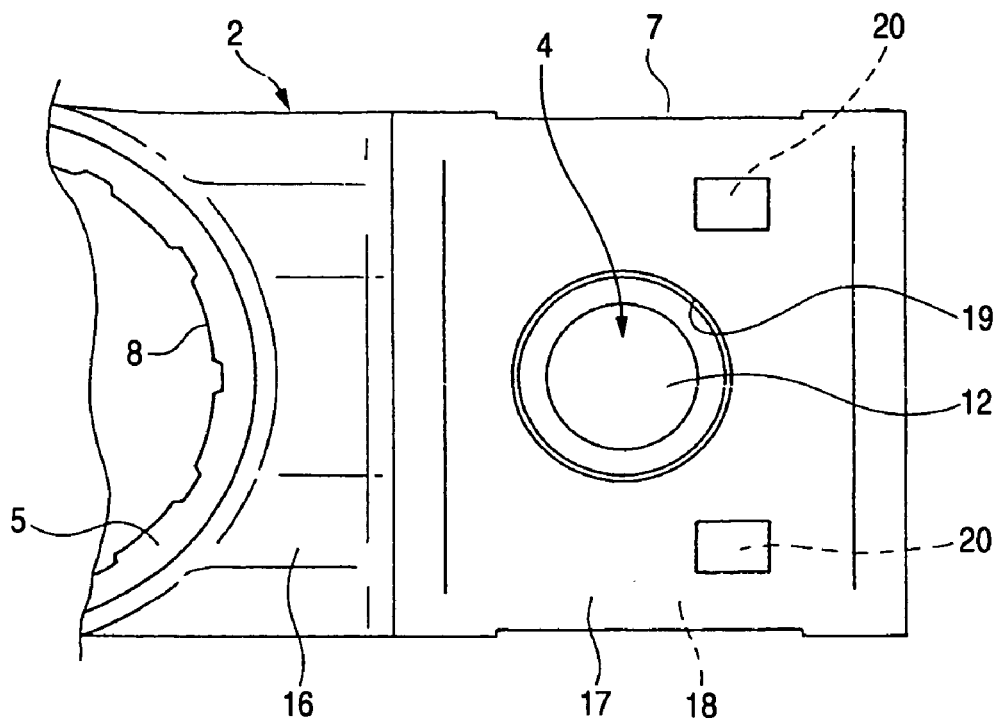
FIG. 2 is an enlarged view of an essential portion of FIG. 1A.
Figure 3:
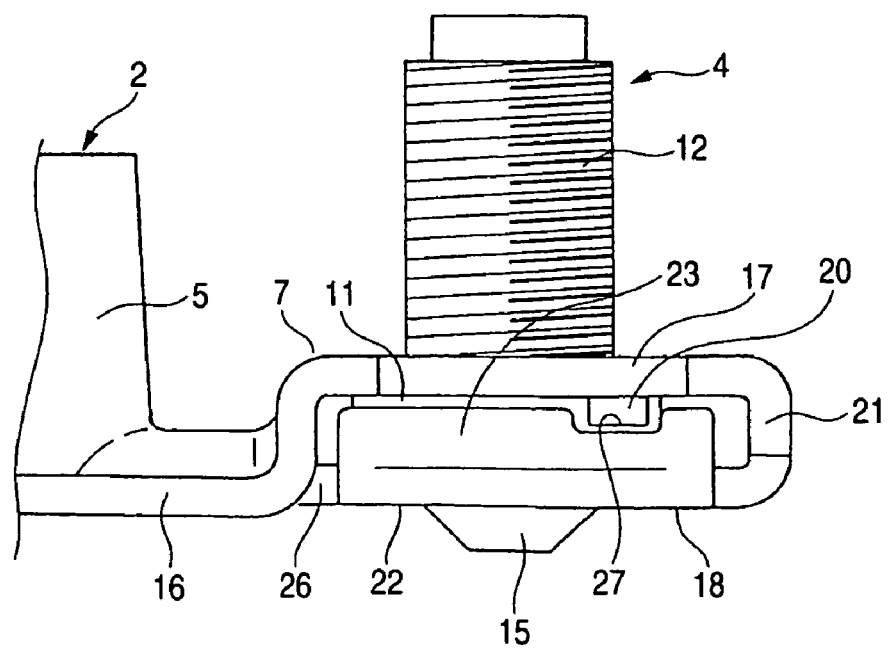
FIG. 3 is an enlarged view of an essential portion of FIG. 1B.
Figure 4:
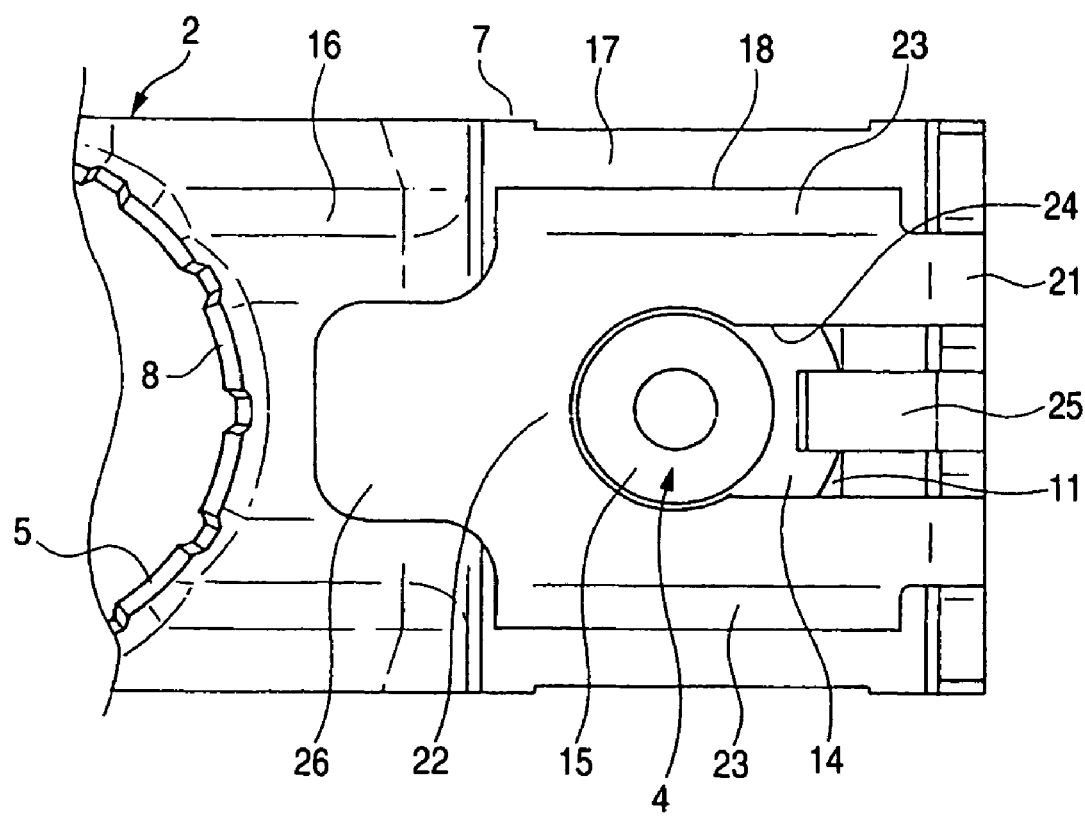
FIG. 4 is an enlarged view of an essential portion of FIG. 1C.
Figure 5:
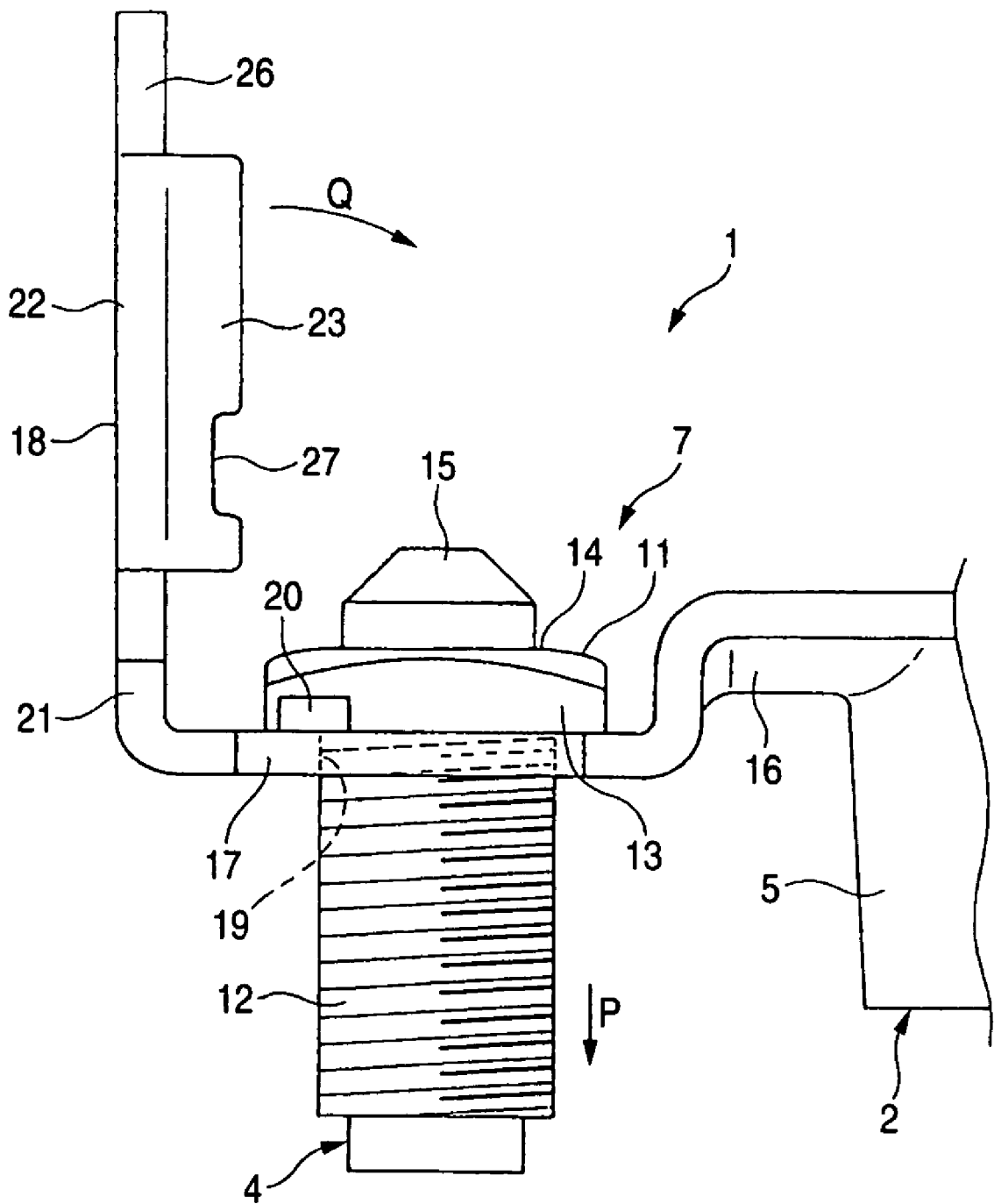
FIG. 5 is a manufacture explaining view.
Figure 6:
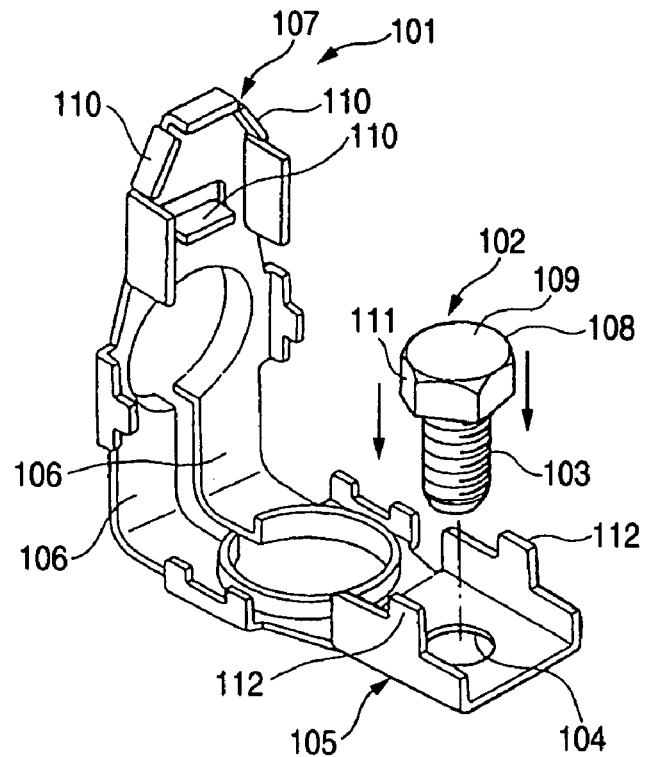
FIG. 6 is a manufacture explaining view (or a perspective view before insertion of a stud bolt) of a battery terminal body in the battery terminal of an example of the prior art.
Figure 7:
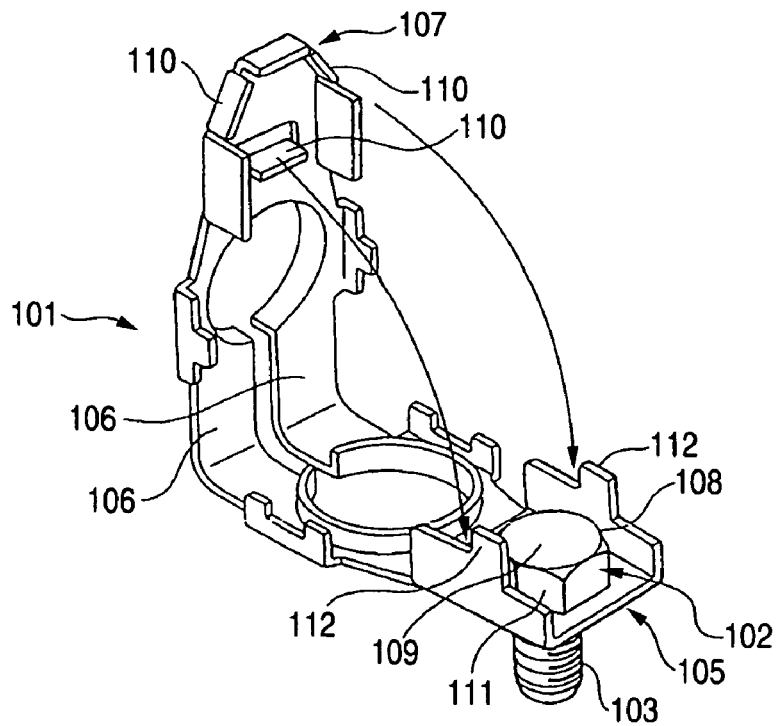
FIG. 7 is a manufacture explaining view (or a perspective view after insertion of the stud bolt) of the battery terminal body in the battery terminal of the example of the prior art.
Figure 8:
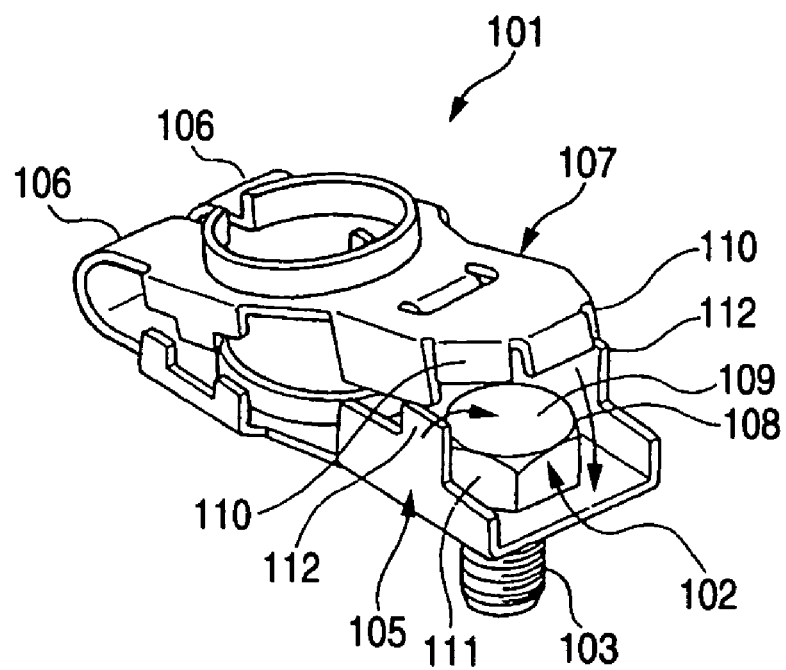
FIG. 8 is a manufacture explaining view (or a perspective view after insertion at the time of superposing a first joint plate and a second joint plate) of the battery terminal body in the battery terminal of the example of the prior art.
Figure 9:
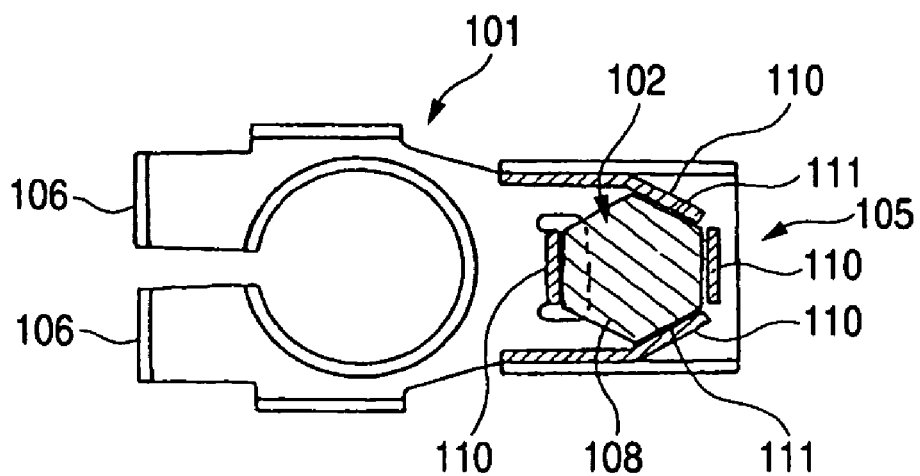
FIG. 9 is a manufacture explaining view (or a sectional view at the time of completion) of the battery terminal body in the battery terminal of the example of the prior art.
Figure 10:
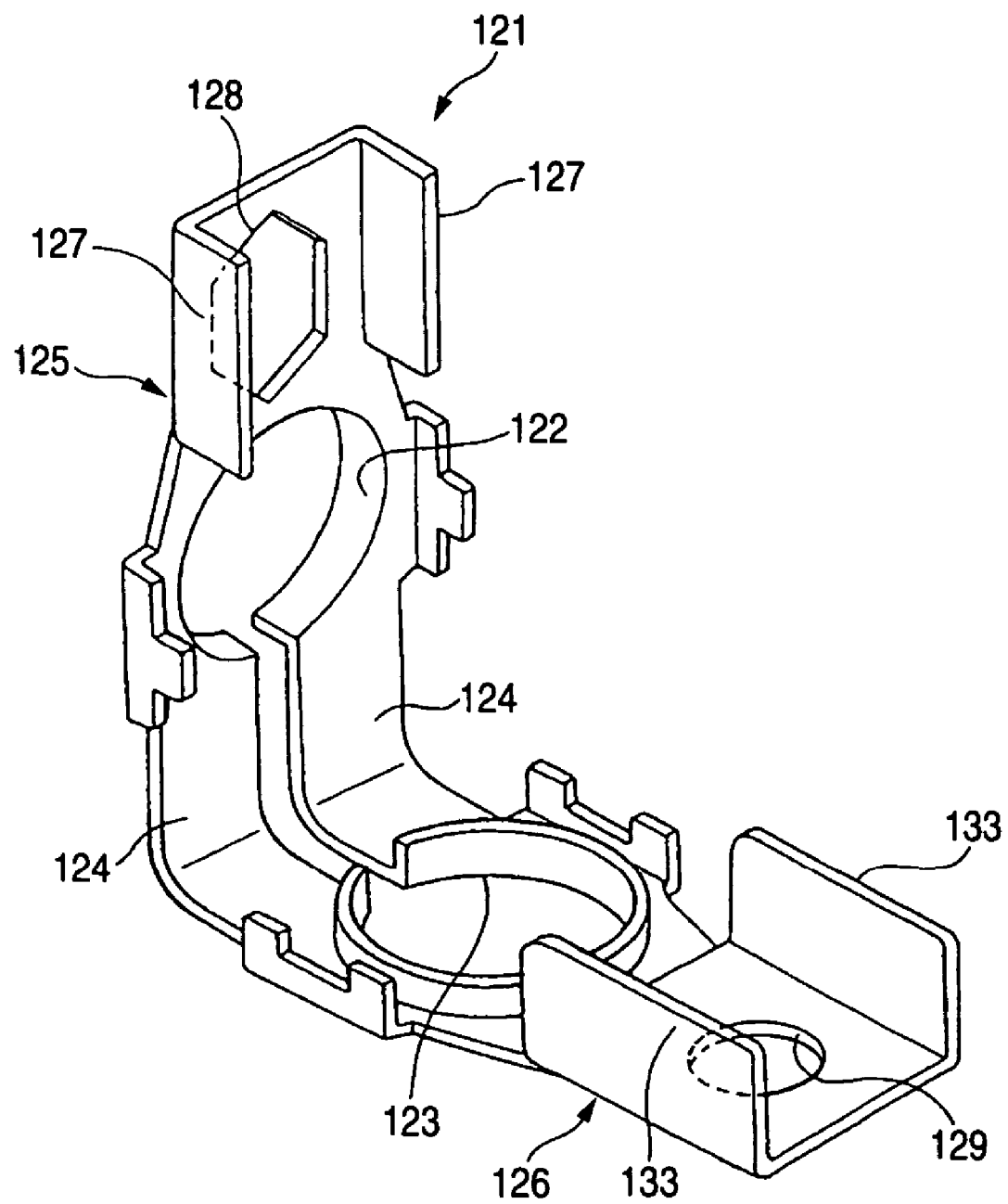
FIG. 10 is a manufacture explaining view (or a perspective view of the battery terminal body) of the battery terminal body in the battery terminal of the example of the prior art.
Figure 11:
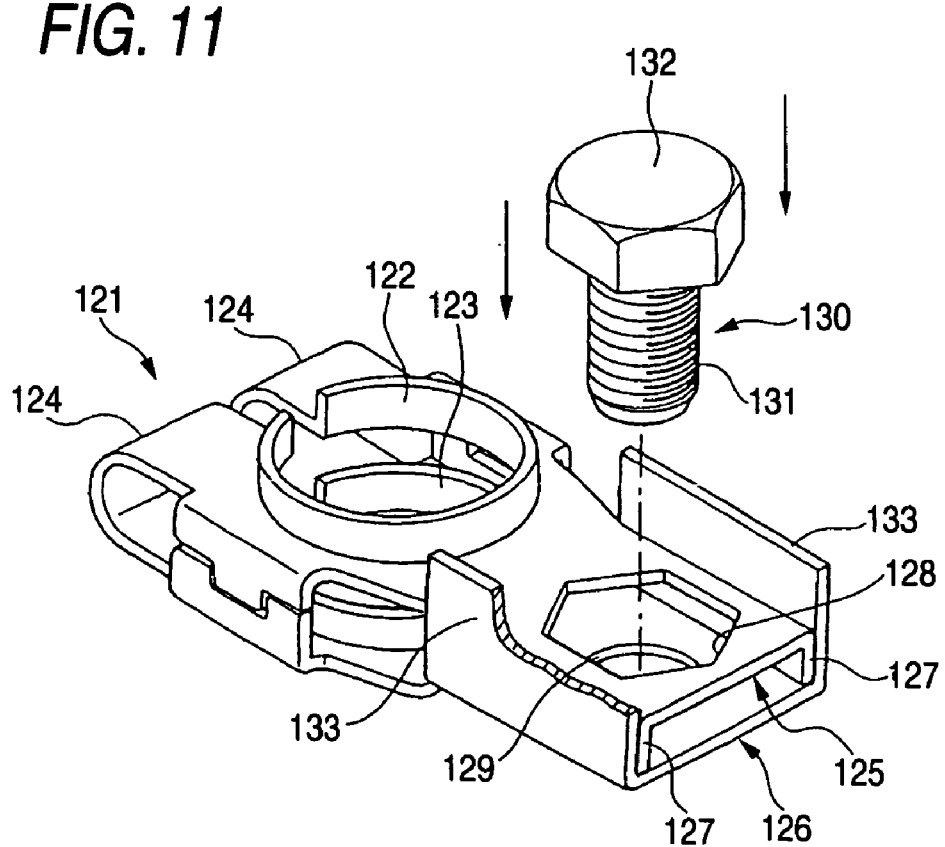
FIG. 11 is a manufacture explaining view (or a perspective view before insertion of a stud bolt) of a battery terminal body in the battery terminal of an example of the prior art.
Figure 12:
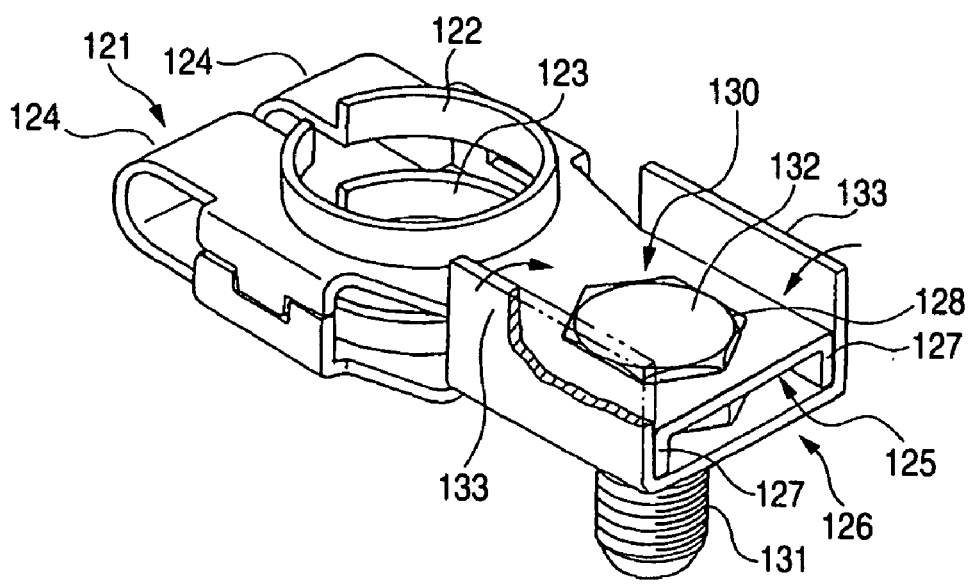
FIG. 12 is a manufacture explaining view (or a perspective view after insertion of the stud bolt) of the battery terminal body in the battery terminal of the example of the prior art.
Figure 13:
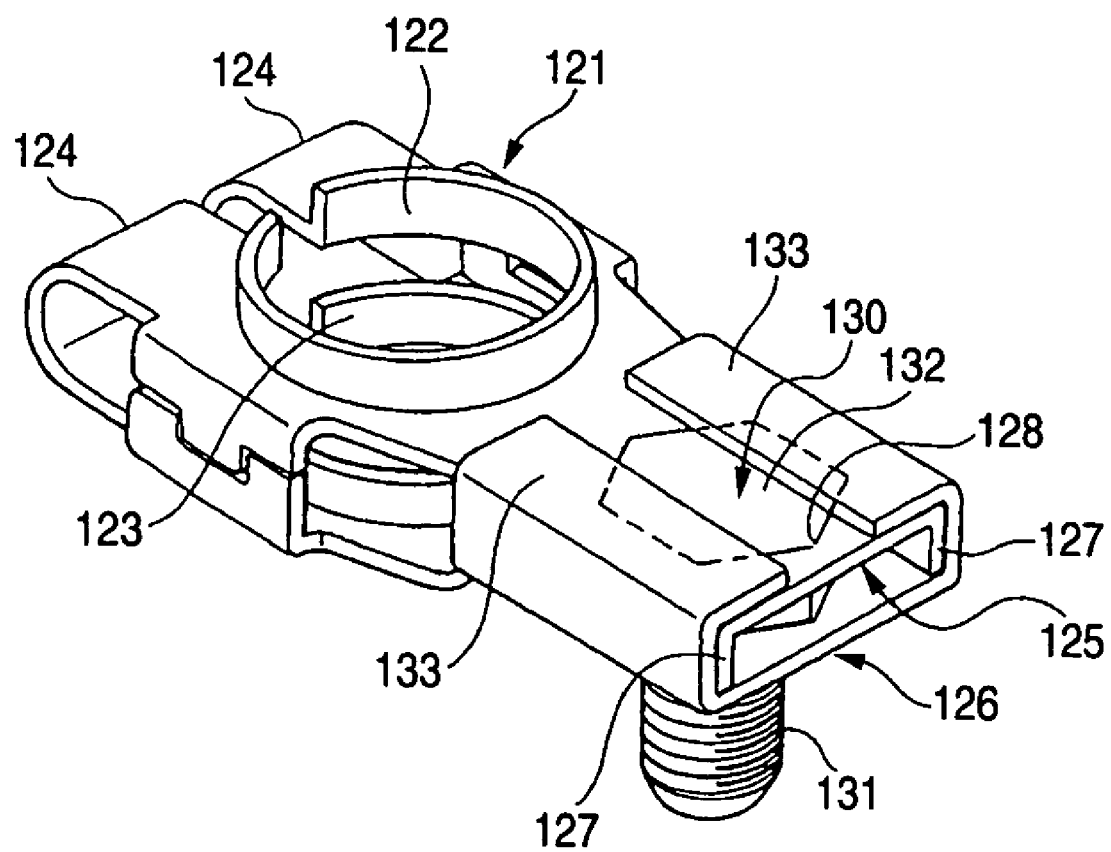
FIG. 13 is a manufacture explaining view (or a sectional view at the time of completion) of the battery terminal body in the battery terminal of the example of the prior art.

The invention will be described with reference to the accompanying drawings. Of FIGS. 1A to 1C show one embodiment of a battery terminal of the invention: FIG. 1A is a top plan view; FIG. 1B is a front elevation; and FIG. 1C is a bottom view. FIG. 2 is an enlarged view of an essential portion of FIG. 1A; FIG. 3 is an enlarged view of an essential portion of FIG. 1A; FIG. 4 is an enlarged view of an essential portion of FIG. 1C; and FIG. 5 is a manufacture explaining view.

In FIGS. 1A to FIG. 4, a battery terminal 1 according to the invention is constituted to include a battery terminal body 2, fastening means 3 and a stud bolt 4. The battery terminal body 2 of the battery terminal 1 thus constituted is formed into the shown shape, for example, by working a metal member having a conductivity. The battery terminal body 2 includes a battery connecting portion 5, fastening portions 6 and 61 and an electric wire connecting portion 7.

The battery connecting portion 5 has an insertion hole 8, through which it is mounted on a battery post disposed on the not-shown battery. The insertion hole 8 has its side face tapered to fit the shape of the battery post. The insertion hole 8 is partially divided to form the fastening portions 6 and 6' continuously. These fastening portions 6 and 6' are formed to reduce the diameter of the insertion hole 8 as they approach each other. To the fastening portions 6 and 6', there are attached a bolt 9 and a nut 10, which constitute the fastening means 3. The fastening portions 6 and 6' are brought close to each other as the bolt 9 and the nut 10 are fastened.

Here, it should be noted that the battery connecting portion 5, the fastening portions 6 and 6' and the fastening means 3 have the shapes presented just for examples. In short, they should not be limited to the shown shapes.

The electric wire connecting portion 7 is made continuous to the battery connecting portion 5. Specifically, the electric wire connecting portion 7 is made continuous to the battery connecting portion 5 on the side opposite to the fastening portions 6 and 6'. The electric wire connecting portion 7 is enabled to connect the LA terminal or the like of the not-shown electric wire terminal by fixing the stud bolt 4. The stud bolt 4 thus fixed in the electric wire connecting portion 7 includes a head 11 and a stem 12. The head 11 has four head side faces 13 (as referred to FIG. 5), a head top face 14 and a positioning projection 15 projecting from the head top face 14 (although the shape of the head 11 is presented just for one example). The electric wire connecting portion 7 is described in detail in the following.

The electric wire connecting portion 7 includes: a continuous portion 16 continuing to the battery connecting portion 5; a plate portion 17 continuing to that continuous portion 16; and a folded side plate portion 18 continuing to the plate portion 17. In the center of the plate portion 17, there is formed a stem hole 19 for inserting the stem 12 of the stud bolt 4 exclusively thereinto. On the outer side of the stem hole 19, moreover, there are formed a pair of locking projections 20, which confront the two head side faces 13 of the head 11 of the stud bolt 4.

In this mode of embodiment, the paired locking projections 20 are formed to project toward the side of the folded side plate portion 18. Specifically, the paired locking projections 20 are formed into projection shapes projecting from the back of the plate portion 17. In this mode of embodiment, the paired locking projections 20 are formed by punching them from the surface to the back of the plate portion 17. The paired locking projections 20 are portions for preventing the stud bolt 4 from rotating, and are arranged such that the two head side faces 13 may abut when the stud bolt 4 rotates. The paired locking projections 20 are spaced to match the distance of the two head side faces 13.

The folded side plate portion 18 includes: a folded portion 21 continuing to the plate portion 17; a head holding portion 22 confronting the head top face 14 of the stud bolt 4 at the folding time; and a pair of folded side locking protrusions 23 confronting the head side faces 13 of the stud bolt 4 separately of the paired locking projections 20. The center of the head holding portion 22 is opened to form a relief portion 24 for the positioning protrusion 15 of the stud bolt 4.

Reference numeral 25 designates a second head holding portion. This second head holding portion 25 is useful for the case, in which the relief portion 24 has a large opening. Numeral 26 designates a fold regulating portion to abut against the back of the continuous portion 16. The folded side plate portion 18 is folded so far that the fold regulating portion 26 may abut against the back of the continuous portion 16.

The paired folded side locking protrusions 23 are formed at positions of the two sides of the folded side plate portion 18. In other words, the paired folded side locking protrusions 23 are formed to continue individually to the two sides of the head holding portion 22. These paired folded side locking protrusions 23 are formed substantially into wall shapes. In the paired folded side locking protrusions 23, there are formed notches 27 for inserting and fitting the locking projections 20. When the folded side plate portion 18 is folded, the locking projections 20 are inserted into the notches 27.

The locking projections 20 function not only to lock the bolt but also to position the folded side plate portion 18. The locking projections 20 are so arranged at the aforementioned positions that they may be easily fitted in the notches 27.

With reference to FIG. 1A to FIG. 5, the manufacture of the portion of the electric wire connecting portion 7 is described in detail (although the description of the manufacture of the remaining portions is omitted).

At a first step, with the plate portion 17 being connected (then, the stem hole 19 is not misaligned, although not shown), the stem 12 of the stud bolt 4 is inserted (as referred to arrow P) into the stem hole 19 of the plate portion 17. Then, the head side faces 13 of the stud bolt 4 are brought to confront the paired locking projections 20 of the plate portion 17 so that the head 11 of the stud bolt 4 is locked by the paired locking projections 20.

At a second step, the plate portion 17 is released from the connected state (then, individual terminals are provided), and the folded side plate portion 18 is folded (as referred to arrow Q) to the back side of the plate portion 17. Then, the head holding portion 22 and the second head holding portion 25 of the folded side plate portion 18 confront the head top face 14 of the stud bolt 4 thereby to hold the head 11 of the stud bolt 4. Thus, the stud bolt 4 is fixed to complete the manufacture of the portion of the electric wire connecting portion 7.

According to the invention, as has been described hereinbefore with reference to FIG. 1A to FIG. 5, the locking operation of the stud bolt 4 can be performed at a stage earlier than that of the prior art. Moreover, the number of manufacturing steps can be made less than that of the prior art. According to the invention, therefore, there can be attained an advantage to improve the production yield. Another advantage of the invention is that the stud bolt 4 can be locked with the simple structure.

In addition, it is quite natural that the invention can be modified in various manners without departing from the gist thereof.

What is claimed is:

1. A battery terminal comprising:
   a stud bolt having a head and a stem; and
   a battery terminal body having an electric wire connecting portion on which the stud bolt is fixed, the electric wire connecting portion including a plate portion and a folded side plate portion extending from said plate portion;
   wherein the plate portion includes a stem hole into which only the stem of the stud bolt is inserted, and a plurality of locking projections confronting a side face of the head of the stud bolt; and
   the folded side plate portion includes a folded portion continuous with said plate portion, and a head holding portion confronting a top face of the head of said stud bolt when the folded side plate portion is folded to oppose the plate portion,
   wherein said folded side plate portion is provided, individually on two sides thereof and separately of said locking projections, with folded side locking protrusions confronting the side face of the head of said stud bolt.

2. A battery terminal as set forth in claim 1,
   wherein said folded side locking protrusions have notches for inserting and fitting the locking projections.

3. A battery terminal comprising:
   a stud bolt having a head and a stem; and
   a battery terminal body having an electric wire connecting portion on which the stud bolt is fixed, the electric wire connecting portion including a plate portion and a folded side plate portion extending from said plate portion;
   wherein the plate portion includes a stem hole into which only the stem of the stud bolt is inserted, and a plurality of locking projections confronting a side face of the head of the stud bolt; and
   the folded side plate portion includes a folded portion continuous with said plate portion, and a head holding portion confronting a top face of the head of said stud bolt when the folded side plate portion is folded to oppose the plate portion such that the head of said stud bolt is retained between the plate portion and the folded side plate portion.

* * * * *